United States Patent [19]

Davis

[11] Patent Number: 4,540,972

[45] Date of Patent: Sep. 10, 1985

[54] HEAT SENSITIVE CABLE

[75] Inventor: Bayard C. Davis, Lombard, Ill.

[73] Assignee: XCO International, Inc., Elgin, Ill.

[21] Appl. No.: 645,901

[22] Filed: Aug. 29, 1984

Related U.S. Application Data

[62] Division of Ser. No. 317,631, Nov. 2, 1981, Pat. No. 4,491,822.

[51] Int. Cl.³ .......................... H01C 3/04; H01C 7/04
[52] U.S. Cl. ........................................ 338/26; 29/573; 29/612; 136/225; 136/230; 136/235; 219/552; 338/22 R; 338/28; 338/214; 338/238; 374/111
[58] Field of Search ................. 338/20, 22 R, 22 SD, 338/25, 26, 27, 28, 30, 208, 230, 238, 239, 240, 241, 242, 322, 332; 29/573, 611, 612, 613, 624; 174/34; 136/225, 228, 230, 233; 219/552, 540, 541, 544; 264/61, 65; 154/2.28; 73/341; 335/89, 94; 340/228, 577, 196; 423/605; 427/42; 374/111, 107, 183; 313/310; 156/53

[56] References Cited

U.S. PATENT DOCUMENTS

| | | | |
|---|---|---|---|
| 2,717,945 | 9/1955 | Dresios et al. | 338/28 |
| 2,728,833 | 12/1955 | Dickey | 338/28 |
| 2,740,874 | 4/1956 | Kelly et al. | 338/26 |
| 2,764,659 | 9/1956 | Postal | 338/26 |
| 2,805,272 | 9/1957 | Postal | 136/228 |
| 2,813,425 | 11/1957 | Woolley | 374/107 |
| 2,842,648 | 7/1958 | Reynolds | 338/26 |
| 2,848,587 | 8/1958 | Postal | 338/26 |
| 2,868,935 | 1/1959 | Howatt | 338/26 |
| 2,936,434 | 5/1960 | Postal | 338/26 |
| 2,941,192 | 6/1960 | Postal | 340/228 |
| 3,045,326 | 7/1962 | Griffiths | 29/612 |
| 3,069,752 | 12/1962 | Sherning | 29/573 |
| 3,089,339 | 5/1963 | Rogers et al. | 338/26 |
| 3,205,296 | 9/1965 | Davis et al. | 174/34 |
| 3,266,001 | 8/1966 | Landis et al. | 338/22 R |
| 3,267,733 | 8/1966 | Chambers | 338/28 |
| 3,295,087 | 12/1966 | Landis et al. | 338/28 |

(List continued on next page.)

| | | | |
|---|---|---|---|
| 3,315,214 | 4/1967 | Davis | 339/94 |
| 3,329,534 | 7/1967 | Adler et al. | 136/233 |
| 3,353,260 | 11/1967 | Davis et al. | 29/573 |

OTHER PUBLICATIONS

Brochure of Alison Control Inc., "Alison Control has the Answer", (8 pages), undated.

Article by Charles Doak of Alison Control Inc., "Integrated Fire Protection for the Modern Generating Station, (4 pages), Instrumentation & Control, undated.

Specification of Alison Control Inc., "9090 Series Continuous Thermister Sensors", (3 pages), 3/6/75 and 9/20/77.

(List continued on next page.)

Primary Examiner—Volodymyr Y. Mayewsky
Attorney, Agent, or Firm—Wood, Dalton, Phillips, Mason & Rowe

[57] ABSTRACT

A heat sensitive cable operable over a temperature range of between approximately −20° F. and 1650° F. The cable includes a tubular metallic sheath which is substantially temperature resistant and moisture impervious. It also includes a mass of compacted insulation material filling the sheath and having an insulation resistance variable with temperature in the range of between approximately 100 and 50,000 ohms. The cable further includes at least one thermoelectric conductor positioned within the insulation material filling the sheath. A method of manufacturing the cable includes the step of preparing the insulation material and advancing the thermoelectric conductor through a given region. It also includes the step of advancing a strip of flat metal material past apparatus for forming and welding a tubular sheath surrounding the given region. The method further includes the step of concurrently depositing the insulation material within the tubular sheath for enclosure and advancing the sheath, insulation material and conductor through apparatus for reducing the diameter of the sheath and applying tension to the conductor. With these steps, the insulation material is compacted and the conductor is positioned within the sheath.

13 Claims, 7 Drawing Figures

U.S. PATENT DOCUMENTS

| | | | |
|---|---|---|---|
| 3,366,913 | 1/1968 | Davis et al. | 338/322 |
| 3,376,169 | 4/1968 | Davis et al. | 136/230 |
| 3,400,356 | 9/1968 | Davis et al. | 338/208 |
| 3,408,607 | 10/1968 | Davis | 338/26 |
| 3,434,207 | 3/1969 | Frachon | 29/612 |
| 3,441,893 | 4/1969 | Gordon et al. | 338/26 |
| 3,444,740 | 5/1969 | Davis | 374/111 |
| 3,451,861 | 6/1969 | Gordon et al. | 136/230 |
| 3,492,170 | 1/1970 | Davis et al. | 136/233 |
| 3,493,949 | 2/1970 | Servos et al. | 340/228 |
| 3,513,432 | 5/1970 | Davis | 338/28 |
| 3,530,423 | 9/1970 | Davis | 339/89 |
| 3,537,053 | 10/1970 | Snoberger et al. | 338/25 |
| 3,538,596 | 11/1970 | Davis et al. | 29/573 |
| 3,607,447 | 9/1971 | Davis | 136/233 |
| 3,622,901 | 11/1971 | Ledran et al. | 338/35 |
| 3,660,158 | 5/1972 | Chen et al. | 427/42 |
| 3,683,696 | 8/1972 | Vaughan et al. | 374/111 |
| 3,729,343 | 4/1973 | Thomas | 136/225 |
| 3,737,997 | 6/1973 | Davis | 29/624 |
| 3,816,182 | 6/1974 | McAdam | 136/230 |
| 3,831,269 | 8/1974 | Sommer | 29/612 |
| 3,925,104 | 12/1975 | Thomas | 136/225 |
| 4,075,036 | 2/1978 | Lysikov et al. | 136/225 |
| 4,085,345 | 4/1978 | Bullat | 310/68 B |
| 4,094,061 | 6/1978 | Gupta et al. | 29/612 |
| 4,175,437 | 11/1979 | Burt | 340/196 |
| 4,324,138 | 4/1982 | Davis | 374/111 |

OTHER PUBLICATIONS

Technical Report of Alison Control Inc., "Technical Report No. 9, 9090 Series Continuous Thermistor Sensor in Nuclear Environments" (6 pages), 11/16/70.

Technical Report of Alison Control Inc., "Technical Report No. 10, Intrinsically Safe Fire Detection Systems", (6 pages), 11/25/70.

Brochure of Fastener Engineers, Inc., "Fe Fastener Engineers In-Line Wire Drawing Machines with Mechanical Variable Speed Drives", (8 pages), undated.

Brochure of Fastener Engineers, Inc., "Fe Fastener Engineers In-Line Wire Drawing Machines with Hydraulic Variable Speed Drives", (4 pages), 5/77.

Brochure of Kidde Belleville Division of Walter Kidde & Company, Inc., "The Cold Facts . . . about Cryogenic Temperature Detection", (2 pages), 11/79.

Literature of Kidde Belleville Division of Walter Kidde & Company, Inc., "Kidde Continuous Strip Fire Detector", (4 pages), 3/79.

Brochure of Kidde Belleville Division of Walter Kidde & Company, Inc., "Superior Protection for Modern Industry with Kidde Fire and Overheat Continuous Detection Systems", (4 pages), approximately 1/07/80.

Brochure of Kidde Belleville Division of Walter Kidde & Company, Inc., "Karos-A Contemporary Computer-Managed Fire and Security System from Kidde Belleville", (8 pages), undated.

Literature of Walter Kidde & Company, Inc., "K Kidde Discrete Temperature Monitoring Systems", (2 pages), 2/77.

Data Sheets of Walter Kidde & Company, Inc., "Sensing Element Continuous Fire Detector", Data Sheets 1422-05 (2 pages), 1422-10 (2 pages), 1422-25 (2 pages), 1422-30 (2 pages), 1422-67 (2 pages), 1422-77 (2 pages), 1422-87 (2 pages), and 1422-97 (2 pages), undated.

Article by R. C. Rittenhouse, "FIRE: Detection and Prevention at Power Plants", Power Engineering, vol. eighty-five, No. 2, (pp. 42 through 50), Feb. 1981.

Catalog of the Protectowire Co., "Protectorwire Heat Detection in Cable Trays and Associated Facilities (13 pages (undated)).

Bulletin TT-318, Insulated Thermocouple and Extension Wires, Trinity Equip. Corp., (6 pages), undated.

HEAT SENSITIVE CABLE

This application is a divisional of co-pending application Ser. No. 317,631 filed on Nov. 2, 1981, now U.S. Pat. No. 4,491,822, issued Jan. 1, 1985.

BACKGROUND OF THE INVENTION

The present invention relates to heat sensitive devices and, more particularly, to a heat sensitive cable and method of making same.

Heat sensitive cables which are characterized by the use of semiconductive materials having inverse temperature-resistance characteristics in conjunction with dissimilar thermoelectric conductors are now well known in the art. Such constructions are particularly suitable where it is desired to monitor the greatest temperature existing along the length of the cable, and are exemplified in connection with a system for measuring and locating temperature conditions of interest in U.S. Pat. No. 3,408,607. Thermister cables which are characterized by a core of semi-conductive material surrounded by a mass of temperature-resistant electrically-insulating material covered with a protective metallic sheath are also well known in the art.

Despite the clear advantages and many applications for such cables, they have simply not evolved to the point of providing the desired degree of versatility. It has remained to develop a heat sensitive cable capable of generating a measurable and predictable voltage when the entire length of cable is at ambient whether ambient be at −20° F., 1650° F., or some value therebetween. If this could be achieved with an inverse temperature-resistance material, the thermoelectric output of the cable or a section thereof would be altered in a predictable fashion when subjected to a temperature greater than ambient.

Moreover, if this could be achieved, the cable location where the increase in temperature takes place could be located electronically. This could be achieved, for instance, as fully disclosed and claimed in copending U.S. Ser. No. 887,089 filed Mar. 16, 1978, now U.S. Pat. No. 4,324,138, issued Apr. 13, 1982, for a method of and apparatus and system for determining temperature conditions. As set forth therein, the applications are virtually limitless.

While the value of heat sensitive cable has long been recognized, it has remained to provide such a cable having the requisite versatility for the many applications to be benefited by use thereof. In fact, despite my many prior inventions in this field, as exemplified by U.S. Pat. Nos. 3,408,607 and 3,513,432, the missing link to providing a highly versatile cable has remained. Despite the advantages that will be recognized by those skilled in the art, heat sensitive cable which is operable over a temperature range of between approximately −20° F. and 1650° F. has simply not been available.

It is therefore an object of the present invention to provide a heat sensitive cable operable over a temperature range of between approximately −20° F. and 1650° F.

It is also an object of the present invention to provide a cable of the type described utilizing a material having an insulation resistance within the indicated temperature range variable with temperature in the range of between approximately 100 and 50,000 ohms.

It is a further object of the present invention to provide a cable of the type described which comprises a thermocouple temperature monitoring device having a metallic tubular sheath containing two dissimilar metal thermocouple wires packed in a semiconductive ceramic powder.

It is another object of the present invention to provide a cable of the type described wherein the thermocouple wires surrounded by semiconductive ceramic powder are spaced equidistant from each other and the outer sheath.

It is still another object of the present invention to provide a cable of the type described which is passive and self-generating to generate a voltage potential between the thermocouple wires indicative of the temperature existing along its entire length or at the hottest point along its length if the temperatures are unequal.

It is still another object of the present invention to provide a cable of the type described capable of precise, non-perishable, reproducible measurement of the temperature and identification of the location of the hottest spot when monitoring with a high input impedance temperature device.

It is another object of the present invention to provide a cable of the type described wherein the tubular sheath and the thermocouple wires can be formed of various materials and combinations of materials to yield various mechanical properties and temperature-voltage response curves.

It is a further object of the present invention to provide a cable of the type described which can be produced in lengths of thousands of feet at a fraction of the cost of making other types or constructions of heat sensitive cable.

An additional object of the present invention is to provide a cable of the type described utilizing commercially available materials and processes to manufacture the cable.

These and other objects, advantages and feature of the present invention will be apparent from a consideration of the accompanying specification, claims and drawings.

SUMMARY OF THE INVENTION

Accordingly, the present invention is directed to a heat sensitive cable operable over a temperature range of between approximately −20° F. and 1650° F. The cable includes a tubular metallic sheath which is substantially temperature resistant and moisture impervious. It also includes a mass of compacted insulation material filling the sheath which has an insulation resistance variable with temperature in the range of between approximately 100 and 50,000 ohms. The cable further includes at least one thermoelectric conductor positioned within the insulation material filling the sheath. With this construction, the cable has the requisite versatility for use over an extremely wide temperature range to serve the many applications encountered today.

In a preferred embodiment, the insulation material comprises manganese dioxide heated in a vacuum furnace at a temperature of approximately 1650° F. Preferably, the manganese dioxide is heated for a period of time of between approximately 3 and 10 minutes with the furnace being drawn to a vacuum of approximately 500 microns of mercury or less. Moreover, the vacuum furnace is advantageously preheated for a period of time of approximately 15 minutes after the manganese dioxide has been placed in the furnace at a temperature of approximately 1250° F. prior to raising the temperature to 1650° F.

With the manganese dioxide treated as described, the insulation material has an insulation resistance of between approximately 3,000 and 6,000 ohms at approximately 72° F. when compacted to approximately 70% of theoretical density within the tubular sheath.

While it is possible to construct a cable with only a single thermoelectric conductor, it is usually advantageous to utilize a pair of thermoelectric conductors positioned within the insulation material filling the sheath. One of the conductors is preferably a wire of nickel/chrome alloy and the other of the conductors is a wire of copper/nickel alloy, the nickel/chrome alloy comprising approximately 90% nickel and 10% chrome and the copper/nickel alloy comprising approximately 55% copper and 45% nickel. Moreover, the sheath is advantageously formed of either 304 or 304L stainless steel or nickel/chrome/iron alloy comprising approximately 75% nickel, 15% chrome and 10% iron.

With respect to the method of manufacturing the cable, the insulation material is prepared having an insulation resistance variable with temperature in the range of between approximately 100 and 50,000 ohms. Next, at least one thermoelectric conductor is advanced through a given region lying generally forwardly and axially of the starting position. Then, a strip of flat metal material is advanced past apparatus forming a tubular sheath surrounding the given region. Next, a sufficient amount of the insulation material is concurrently deposited within the sheath to fill the formed sheath. Finally, the sheath, insulation material contained therein and the conductors are advanced through apparatus for reducing the diameter of the sheath and applying tension to the conductor. With this method, the insulation material is compacted and the conductor is permanently positioned within the sheath.

In order to prepare the insulation material, manganese dioxide is advantageously placed in a tube having closure means in both ends thereof. The closure means, such as plugs, are threadingly engaged with the tube before placement of the tube in the vacuum furnace. Preferably, the plugs are tightened to compact the manganese dioxide in the tube and the plugs are loosened one turn before placement of the tube in the vacuum furnace.

With regard to reducing the diameter of the sheath, the sheath is suitably drawn to a diameter no smaller than approximately 87% of the outside diameter of the sheath as formed. It is then preferable to vacuum anneal the sheath after drawing for a period of time of between approximately 5 and 15 minutes at a temperature of approximately 1650° F. If the sheath is to be reduced any further in diameter, the sheath is subsequently drawn and annealed after every 30% reduction in diameter until the diameter of the sheath has been reduced to a desired dimension.

DETAILED DESCRIPTION OF THE PREFERRED EMBODIMENTS

Figure 1:
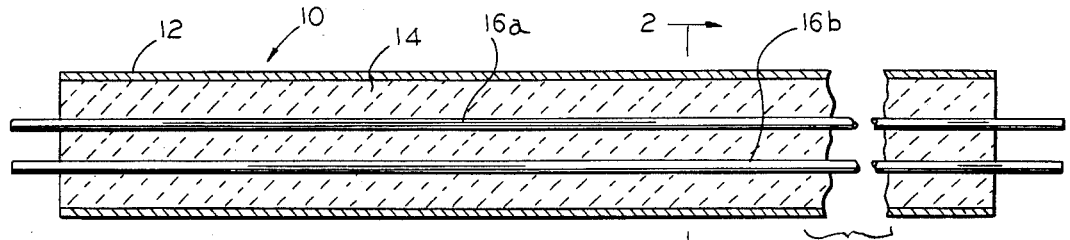
FIG. 1 is a longitudinal cross sectional view of a heat sensitive cable in accordance with the present invention.

Referring to the drawings, and first to FIG. 1, the reference numberal 10 designates generally heat sensitive cable in accordance with the present invention. The cable includes an elongated tubular metallic sheath 12 which is substantially temperature resistant and moisture impervious. It also includes a mass of compacted insulation material 14 which fills the sheath 12 and which has an insulation resistance variable with temperature in the range of between approximately 100 and 50,000 ohms. The insulation material 14 is such that a measurable and predictable voltage is generated over a broad temperature range. It is also a feature of the insulation material 14 that the measurable and predictable voltage is indicative of temperature and is generated continuously in the temperature range in a passive, self-generating manner. The cable further includes at least one elongated thermoelectric conductor means, such as the wire 16a, positioned within the insulation material 14 filling the sheath 12. With these features of construction, the cable 10 is operable over a temperature range of between approximately −20° F. and 1650° F.

In accordance with the invention, the insulation material 12 comprises manganese dioxide which has been heated in a vacuum furnace at a temperature of approximately 1650° F. The heating within the furnace takes place for a period of time within the range of between approximately 3 and 10 minutes with the vacuum furnace being drawn to a vacuum of approximately 500 microns of mercury or less. Preferably, the vacuum furnace will have been preheated for a period of time of approximately 15 minutes after the manganese dioxide has been placed in the furnace at a temperature of approximately 1250° F. prior to raising the temperature to 1650° F.

By treating the manganese dioxide in this fashion, the insulation material 12 will have a final insulation resistance of between approximately 3,000 and 6,000 ohms at approximately 72° F. These characteristics are particularly advantageous for measuring an increase from room temperature (ambient). As a result, the cable will generate a voltage differential in the presence of a localized temperature increase over the ambient temperature or a general temperature increase or decrease in the ambient temperature itself.

In the latter case, a conventional single point thermocouple can be incorporated to achieve still additional advantages. Specifically, this results in the production of a similar voltage increase for a similar temperature increase thereby providing the unique ability, e.g., to permit instrumentation to provide an alarm signal whenever an increase in local temperature exceeds the ambient by a preselected amount, regardless of the ambient temperature. In other words, comparing the voltage output of the heat sensitive cable of the present invention with the voltage output of a conventional single point thermocouple, it is possible to provide automatic linear ambient temperature adjustment.

In the embodiment illustrated in FIG. 1, the cable 10 includes a pair of elongated thermoelectric conductor means, such as wires 16a and 16b, positioned within the insulation material 12 filling the sheath 10. It is advantageous for one of the wires 16a to be a wire of nickel/chrome alloy and the other of the wires 16b to be a wire of copper/nickel alloy, with the nickel/chrome alloy comprising approximately 90% nickel and 10% chrome and the copper/nickel alloy comprising approximately 55% copper and 45% nickel. Moreover, the sheath 10 is preferably formed of either 304 or 304L stainless steel or nickel/chrome/iron alloy with approximately 75% nickel, 15% chrome and 10% iron.

Figure 2:
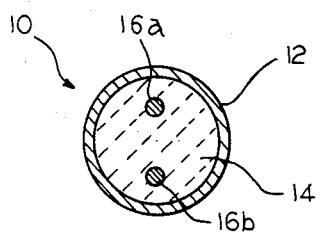
FIG. 2 is a cross sectional view taken on the line 2—2 of FIG. 1.

Referring to FIG. 2, it will be appreciated how the wires 16a and 16b are disposed in spaced and substantially parallel relation to one another and the sheath 12, and the wires 16a and 16b extend through at least one end of the sheath 12 for connection to a suitable instrument (not shown) for measuring the voltage generated therebetween. The insulation material 14 completely surrounds each of the wires 16a and 16b, separating and electrically insulating them from one another and from the sheath 12 and maintaining them in spaced and substantially parallel relation to one another and the sheath 12. However, since the insulation resistance of the insulation material 12 is only in the range of between approximately 100 and 50,000 ohms, the cable 10 is capable of generating measureable voltages across the wires 16a and 16b in accordance with the well known Seebeck effect anywhere within the range of temperatures of between approximately −20° F. and 1650° F.

Figure 3:
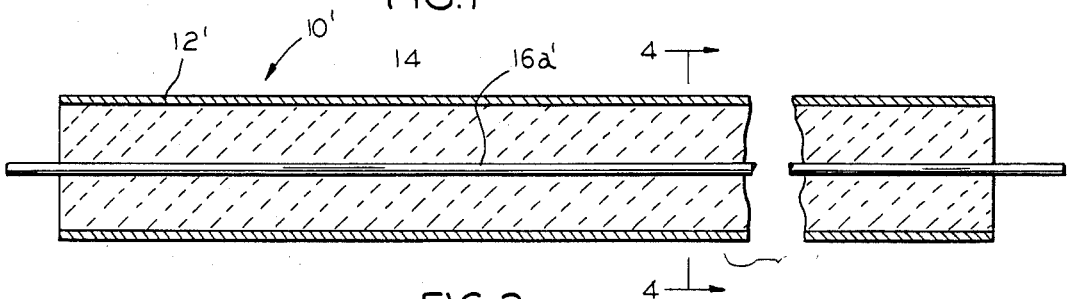
FIG. 3 is a longitudinal cross sectional view of a modified heat sensitive cable in accordance with the present invention.
Figure 4:
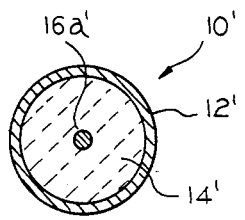
FIG. 4 is a cross sectional view taken on the line 4—4 of FIG. 3.

Referring to FIGS. 3 and 4, it will be appreciated that the cable 10' similarly includes a sheath 12' containing an insulation material 14'. The principal difference between the embodiment illustrated in FIGS. 3 and 4 and the embodiment previously described in FIGS. 1 and 2 is that the cable 10' utilizes only a single thermoelectric conductor means, such as wire 16a', rather than a pair of wires, such as 16a and 16b, in the earlier described embodiment. As will be appreciated by those skilled in the art, the cable 10' generates the measurable voltage between the wire 16a' and the sheath 12'.

With respect to the method of manufacturing the cable, the insulation material is prepared having a compacted insulation resistance in final form variable with temperature in the range of between approximately 100 and 50,000 ohms. Next, at least one thermoelectric conductor means is advanced from a starting position through a given region lying generally fowardly and axially of the starting position. Then, a strip of flat metal material is advanced past tubular sheath forming and welding means so as to form a tubular sheath therefrom in a position surrounding the given region. Next, a sufficient amount of the insulation material is concurrently deposited within the sheath to fill the formed sheath. Finally, the sheath, insulation material contained therein and conductor means are advanced through means for reducing the diameter of the sheath and applying tension to the conductor means. With this method, the insulation material is compacted and the conductor means is permanently positioned within the cable.

In order to avoid unduly lengthening the description herein, my invention disclosed and claimed in U.S. Pat. No. 3,737,997 is incorporated by reference as fully teaching the means by which the cable of the present invention may be continuously manufactured. It will be appreciated, however, that the means by which the insulation material is prepared is not taught in that patent and the preparation of the insulation material represents an important aspect of the present invention. Since it has not previously been possible to prepare an insulation material having a compacted insulation resistance in final form variable with temperature in the range of between approximately 100 and 50,000 ohms and operable within the extremely broad temperature range of the cable herein, the specifics of preparing the material will be set forth in some detail.

Figure 5:
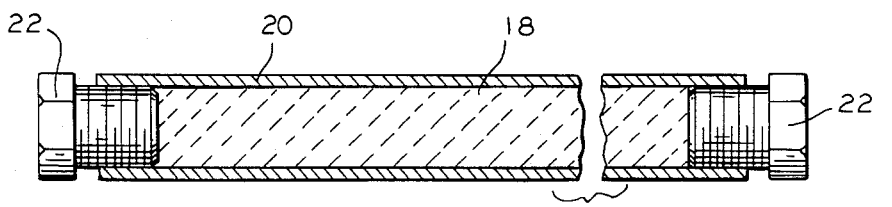
FIG. 5 is a longitudinal cross sectional view of an apparatus for preparing a material for insulation in the cables illustrated in FIGS. 1 and 3.
Figure 6:
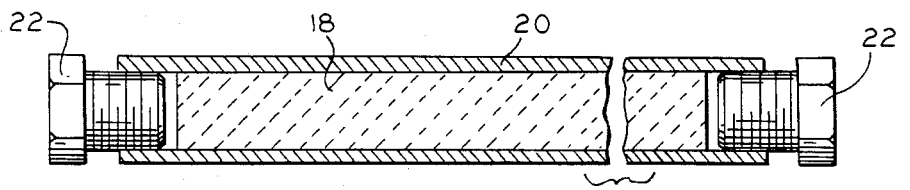
FIG. 6 is a view similar to FIG. 5 showing the plugs loosened prior to heating.
Figure 7:
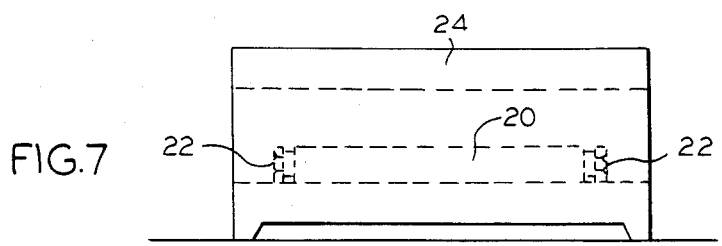
FIG. 7 is a longitudinal view of the apparatus of FIGS. 5 and 6 in a vacuum furnace for heating of the material to be used as insulation in the cables of FIGS. 1 and 3.

As previously mentioned, the insulation material comprises manganese dioxide heated in a vacuum furnace for a period of time of between approximately 3 and 10 minutes at a temperature of approximately 1650° F. The manganese dioxide 18 is preferably placed in a tube 20 (see FIG. 5) having closure means, such as plugs 22 in both ends thereof with the plugs 22 being threadingly engaged with the tube 20 before placement of the tube in the vacuum furnace 24 (see FIG. 7). As shown in FIG. 5, the plugs 22 are tightened to compact the manganese dioxide 18 after placement in the tube 20 and the plugs are subsequently loosened one turn (see FIG. 6) before placement of the tube in the vacuum furnace 24. The manganese dioxide 18 has a grain size larger than any gap between the mating thread 20a and 22a of the tube 20 and the plugs 22. Otherwise, the manganese dioxide 18 could be drawn from the tube 20 into the vacuum furnace 24 causing damage to the vacuum pump.

As previously described, the vacuum furnace is preferably drawn to a vacuum of approximately 500 microns of mercury after placement of the manganese dioxide into the furnace. The vacuum furnace is advantageously preheated after the manganese dioxide has been placed in the furnace for a time of approximately 15 minutes and at a temperature of approximately 1250° F. prior to raising the temperature to 1650° F. for the 3 to 10 minute time period. By utilizing the parameters set forth, the insulation material which results has an insulation resistance when compacted in final form of between approximately 3,000 and 6,000 ohms at a temperature of approximately 72° F.

It will be appreciated that the diameter of the cable can be reduced by suitable means such as drawing. The process contemplates the sheath being drawn to a diameter no smaller than approximately 87% of the outside diameter of the sheath as formed after which the sheath is vacuum annealed for a time of between approximately 5 and 15 minutes at a temperature of approximately 1650° F. Subsequently, the sheath can be drawn and annealed after every 30% reduction in diameter until the diameter of the sheath has been reduced to a desired dimension.

Depending uopn the environmental conditions during the manufacturing process, the insulation material may absorb moisture. For this reason, the insulation material is preferably stored in a supply bin heated to a temperature of between approximately 220°–250° F. for deposit in the formed sheath. By utilizing the heated supply bin, it is possible to prevent moisture accumulation in the insulation material.

With the present invention, it is possible to provide an essentially continuous heat sensitive cable, i.e., the cable can be produced in lengths of thousands of feet. Moreover, the heat sensitive cable of the present invention can be manufactured at a fraction of the cost of making conventional types or constructions of heat sensitive cable. As will be appreciated, heat sensitive cable proposed in the past could only be made in short lengths utilizing labor intensive manufacturing methods.

At present, the final chemical composition of the insulation material is now known. It is known that pure manganese dioxide is an absolute electrical conductor. By heating the manganese dioxide in a vacuum furnace drawn to a vacuum of 500 microns of mercury or less and heated at approximately 1650° F. for a period of time of between approximately 3 and 10 minutes after a preheat at 1250° F. for approximately 15 minutes, a material is formed having a measurable insulation resistance, contrary to what might be expected, which is believed to be something in the nature of $Mn_2O_3$ but with a higher oxygen content. It is known that this results in an insulation material which when compacted in final form has the desired resistance characteristics. Specifically, when compacted in final form, the insulation material has a resistance within a temperature range of between approximately −20° F. and 1650° F. variable with temperature within a range of between approximately 100 and 50,000 ohms.

With the present invention, the heat sensitive cable provides a thermocouple temperature monitoring device which consists of a metallic tubular sheath containing two dissimilar metal thermocouple wires packed in a ceramic powder which is a semiconductor. The wires, surrounded by the ceramic powder, are spaced equidistant from each other and equidistant from the outer sheath. The cable is passive and self-generating to generate a voltage potential between the thermocouple wires which is indicative of the temperature existing along its entire length, or if the temperatures are unequal, at the hottest point along the cable length when subjected to external temperatures. When monitored by a high input impedance temperature device, the heat sensitive cable is capable of (1) precise, non-perishable, reproducible measurement of the temperature and (2) identification of the location of the hottest spot, and is capable of utilizing varying combinations of materials to yield various mechanical properties and temperature-voltage response curves.

Various changes coming within the spirit of the present invention may suggest themselves to those skilled in the art. Hence, it will be understood that the invention is not to be limited to the specific embodiments shown and described or the uses mentioned. On the contrary, the specific embodiments and uses are intended to be merely exemplary with the present invention being limited only by the true spirit and scope of the appended claim.

I claim:

1. A heat sensitive cable capable of generating a measurable and predictable voltage over a temperature range of between approximately −20° F. and 1650° F., comprising:

an elongated substantially temperature resistant and moisture impervious tubular metallic sheath;

an elongated conductor means positioned within said sheath, said conductor means being thermoelectrically dissimilar to said sheath and being disposed in spaced and substantially parallel relation to said sheath, said conductor means extending through at least one end of said metallic sheath for measuring said voltage; and means for electrically insulating said conductor means from said sheath and maintaining said conductor means in spaced and substantially parallel relation to said sheath, said insulation means having an insulation resistance variable with temperature over said temperature range between approximately 100 and 50,000 ohms and being such that said measurable and predictable voltage is generated in said temperature range between said conductor means and said sheath, said measurable and predictable voltage being indicative of temperature and being generated continuously in said temperature range in a passive, self-generating manner.

2. The cable as defined by claim 1 wherein said insulation material comprises manganese dioxide heated in a vacuum furnace at a temperature of approximately 1650° F.

3. The cable as defined by claim 2 wherein said manganese dioxide is heated in said vacuum furnace at said temperature for a period of time from between approximately 3 and 10 minutes.

4. The cable as defined by claim 3 wherein said manganese dioxide is heated with said vacuum furnace drawn to a vacuum of approximately 500 microns of mercury or less.

5. The cable as defined by claim 3 wherein said manganese dioxide is preheated in said vacuum furnace for a period of time of approximately 15 minutes at a temperature of approximately 1250° F. prior to raising the temperature to 1650° F.

6. The cable as defined by claim 1 wherein said insulation material has an insulation resistance of between approximately 3,000 and 6,000 ohms at approximately 72° F. when compacted to approximately 70% of theoretical density within said tubular sheath.

7. The cable as defined by claim 1 wherein said conductor means is a wire of nickel/chrome alloy comprising approximately 90% nickel and 10% chrome.

8. The cable as defined by claim 1 wherein said conductor means is a wire of copper/nickel alloy comprising approximately 55% copper and 45% nickel.

9. The cable as defined by claim 1 wherein said sheath is formed of 304 stainless steel.

10. The cable as defined by claim 1 wherein said sheath is formed of nickel/chrome/iron alloy.

11. The cable as defined by claim 10 wherein said nickel/chrome/iron alloy comprises approximately 75% nickel, 15% chrome and 10% iron.

12. The heat sensitive cable as defined by claim 1 wherein said measurable voltage is indicative of the temperature existing along the entire length of said cable if there are equal temperatures.

13. The heat sensitive cable as defined by claim 1 wherein said measurable voltage is indicative of the temperature existing at the hottest point along the entire length of said cable if there are unequal temperatures.

* * * * *